US010257358B2

(12) United States Patent
Smallwood

(10) Patent No.: US 10,257,358 B2
(45) Date of Patent: Apr. 9, 2019

(54) METHOD TO OPTIMIZE SMALL LODGING FACILITIES' REVENUE FROM RESERVATION CALLS

(71) Applicant: John Smallwood, Albuquerque, NM (US)

(72) Inventor: John Smallwood, Albuquerque, NM (US)

(73) Assignee: VOICE TEAM, LLC, Santa Fe, NM (US)

( * ) Notice: Subject to any disclaimer, the term of this patent is extended or adjusted under 35 U.S.C. 154(b) by 0 days.

(21) Appl. No.: 16/129,676

(22) Filed: Sep. 12, 2018

(65) Prior Publication Data
US 2019/0082054 A1 Mar. 14, 2019

Related U.S. Application Data

(60) Provisional application No. 62/557,504, filed on Sep. 12, 2017.

(51) Int. Cl.
H04M 3/523 (2006.01)
H04M 3/51 (2006.01)
G06Q 50/12 (2012.01)
G06Q 10/02 (2012.01)
G06Q 30/04 (2012.01)

(52) U.S. Cl.
CPC .......... H04M 3/5237 (2013.01); G06Q 10/02 (2013.01); G06Q 30/04 (2013.01); G06Q 50/12 (2013.01); H04M 3/5108 (2013.01); H04M 3/5191 (2013.01)

(58) Field of Classification Search
CPC .... H04M 3/51; H04M 3/5237; H04M 3/5191; H04M 2203/40; H04M 3/523; H04M 3/5183
USPC ............ 379/265.02, 265.01, 266.01, 265.11, 379/207.15, 266.02, 265.13
See application file for complete search history.

(56) References Cited

U.S. PATENT DOCUMENTS

| 6,990,457 | B1 * | 1/2006 | Litman | G06Q 10/02 705/5 |
| 2007/0075136 | A1 * | 4/2007 | Jacob | G06Q 10/02 235/383 |
| 2009/0172035 | A1 * | 7/2009 | Lessing | G06F 17/30595 |

* cited by examiner

Primary Examiner — Thjuan K Addy
(74) Attorney, Agent, or Firm — AleonLaw, P.C.; Alberto A. León

(57) ABSTRACT

A method to optimize the revenue small lodging facilities realize from reservation calls, the method comprising onboarding call center lodging facilities in an automatized and therefore cost-effective manner; receiving and answering calls directed to lodging facilities; and providing system operation and invoicing services for lodging facilities.

1 Claim, 3 Drawing Sheets

FACTORS AND LOGISTICS OF ONBOARDING CALL CENTER LODGING FACILITIES

METHOD TO OPTIMIZE SMALL LODGING FACILITIES' REVENUE FROM RESERVATION CALLS

CROSS-REFERENCE TO RELATED APPLICATION

Provisional Application No. 62/557,504 filed on Sep. 12, 2017

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

Technical Field of the Invention

The present invention generally pertains to call centers, and in particular to a method that provides a call center specifically designed for smaller lodging facilities. Even more particularly, the invention pertains to providing a call center for small lodging facilities that allows the lodging facilities to earn additional marginal revenue by not missing important reservation calls while being away from or performing other management tasks at the property.

Description of the Related Art Including Information Disclosed Under 37 CFR 1.97 and 37 CFR 1.98

The following description of the art related to the present invention refers to a number of publications and references. Discussion of such publications herein is given to provide a more complete background of the principles related to the present invention and is not to be construed as an admission that such publications are necessarily prior art for patentability determination purposes.

A call center is an independent business or a division of a larger company that, through an office, a series of offices or, by using home office-based agents, and utilizing computerized technology, receives, answers and handles incoming and outgoing telephone and voice calls from new and existing customers. Call centers are used for marketing, sales, to provide information, troubleshooting and other aspects of customer service. Usually, a team of advisors or agents who are typically known as "call center agents" handle the calls. Most commonly, relatively large companies either have their own call centers or contract the services to a third-party call center company.

Most of the basic features of today's call centers date back to the mid-1960s. It was then when Private Automated Business Exchanges ("PABXs") began to be used to handle large numbers of customer contacts that some companies were having.

The most commonly known computerized technology that made possible the creation of call centers as we know them today is the Automatic Call Distributor ("ACD"). In fact, the development and advances of ACD technology is closely linked to the creation and advances of the call centers. ACD systems allow customer calls to be filtered and assigned to particular call center agents available at the time. An algorithm determines which agent receives which call. The invention of ACD technology made the concept of a call center possible. Essentially, ACD technology replaced the human operator's human decision-making about whom to assign a call with a far more flexible, automated and efficient system capable of handling much greater numbers of calls. Today's call centers can provide general service to customers, handle queries, offer product or service support, carry out telemarketing, or help with market research.

Call centers are valuable assets and tools that are greatly utilized in a large variety of industries, notable in the hospitality industry. Call centers can provide a platform for a lodging facility to maintain prior customers, gain new customers, enhance its image, address and resolve problems, and create a stronger customer base by using trained agents to answer the calls. In today's lodging and many other industries, many call centers use the services of call center agents who work from home offices.

The most relevant parameters that separate the most successful and profitable call centers from the average ones relate to customer experience and depend on the internal functioning of the center. Those two parameters can be measured by keeping track of metrics such as: (1) average call handling time; (2) during and after-call customer satisfaction; (3) service level (or how quickly calls are answered and how efficient and knowlegeable the agent is); and (4) cost per call. However, one of the most important metrics or key performance indicators (KPIs) of call centers is what is known in the industry as "call conversion," or more accurately, salesmanship. Call conversion, as the term indicates, generally measures to the number of calls (usually expressed in the percentage of total calls) that result in revenue for the entity being called.

Call centers can use many technologies to provide its services, such as queuing systems, automated scheduling, speech recognition, multichannel call routing, and workforce management software.

Payroll accounts for around 70% of the operational costs of a typical call center, making the agents the key and most costly asset of a call center business. That is because the people who answer the phone interact directly with the customer and, therefore, have a genuine, human impact on the customer, as contrasted to the technology or the processes being used.

Investing in the right people and providing the proper training will provide the desired results. Unfortunately, however, many call centers do not understand that concept. Instead, call center management often believes that the typical high turnover among call center agents justifies many call centers' failure to invest time and resources in recruiting the best candidates and training their call center agents. Ironically, one of the key reasons why call center agents leave their employment in call centers is because of the lack of training or ability to grow and progress.

Where there are large groups of people working together, there can be problems, and call centers have a reputation for turnover and absenteeism. Those challenges make managing the call center especially difficult because managers must forecast and plan their resources very tightly against predicted call volume; although call volume can be unpredictable. If a center is understaffed, queues will form and service level KPIs will suffer and customers will become dissatisfied, causing even more pressure on agents.

Ultimately, a call center agent interacts with more customers in a day than most other personnel of a lodging facility combined. Properly trained agents are a tremendous resource to learn what is happening with customers, what is important to them, and what competitors may be doing. Agents can be an invaluable research and market predictor tool, and provide a multitude of ideas on how to do things better or what will or will not work. The best call centers use their agents as a means of providing feedback to all parts of an organization.

Call centers are an easy target to criticize, because most people have had experience with them, and can become "instant experts", making call centers soft targets. Criticizing the call center and highlighting failures will enable others to detract attention from their own performance. In reality, few business people and consumers understand the complexities of call centers and the multi-faceted issues that they must manage and balance.

More importantly, businesses, specifically lodging facilities, that utilize call centers often do not see them as providing opportunities to advance the interests and image of a lodging facility, or as a source of revenue. That is because there is an incorrect perception that "everyone" now books online or on a mobile device, or through "automatized" and computerized call center applications or software programs. That perception makes call centers vulnerable and open to attack. Essentially, many lodging facility managers see call centers as "cost center", when in reality call centers are, and should be, a profit center.

BRIEF SUMMARY OF THE INVENTION

Objects, advantages and novel features, and further scope of applicability of the present invention will be set forth in part in the detailed description to follow, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

Unlike a few other industries, it is not cost-effective for professional on-shore (US-based) call centers to provide a classic hospitality call center service for small lodging facilities (Inns and bed and breakfasts ["B&Bs"]). Further, the less expensive off-shore call centers present problems such as communication difficulties due to language barriers and lack of knowlege of language subtleties and nuances, which mastery is crucial in effective salesmanship.

The method of the present invention comprises three general steps, which themselves comprise multiple sub-steps: (1) onboarding call center lodging facilities; (2) receiving and answering calls directed to lodging facilities; and (3) system operation and invoicing services for lodging facilities.

The costs of onboarding call center clients for an on-shore call center to take on a small lodging facility client often outweighs the potential revenue the call center may receive; call volume from small, individual lodging facilities is very small compared with large lodging chains, for example. that kind of call volume does not provide the revenue needed to support the services of a professional call center. that contrast provides an opportunity to create a unique business model for call centers that can profitably and efficiently service such smaller clients like small lodging facilities, while allowing for healthy earnings and profits. It is important to remark that for such a new business model to work, it must be profitable for both the small lodging facilities and call center. Profitability, therefore, is the key concept for such a business method or model to work.

The above overview of call centers clearly illustrates how essential they are for larger lodging operations, especially multi-facilities chains, which can add up to hundreds or thousands. That in turn, adds up to thousands or tens of thousands rooms. Even though they are just as important for small lodging facilities, it is not profitable for Inns and B&Bs to have call centers in-house. Therefore, in those cases, owners or untrained, non-specialized multi-tasking staff handle calls and reservations. Further, it is not profitable for call centers to take most small lodging facilities as clients because, as described above, they do not present enough call volume for the call center to cover onboarding and training costs.

Our invention presents a way to solve the problems enumerated and explained above by automating much of the onboarding and servicing for Inns and B&Bs. Such automation allows call centers to profitably answer calls for Inns and B&Bs, providing a much-needed service for those smaller lodging facilities.

DETAILED DESCRIPTION OF THE INVENTION

A detailed explanation of how the present invention addresses, cures, and ultimately solves the problems presented above can best be achieved by way of the examples of actual problems faced by smaller lodging facilities, as set forth immediately below.

1. How to Convey Detailed Information About a Small Inn or B&B to the call center. This application already illustrated how it is not profitable for a call center to answer calls for small properties, because the call volume is not large enough to generate suitable fees for the call center. It is also not financially feasible for a small lodging facility to create and operate an -in-house call center. Specifically, creating an email exchange or telephone call for the Inn or B&B owner to describe all the pertinent information a call center would need to know about the Inn or B&B to the call center staff is not feasible or cost-effective. The present invention addresses and solves those problems by creating a self-guided, intelligently-constructed, universal, and comprehensive data entry process that will allow the Inn's or B&B's owner (at his own pace and on his time) to provide detailed information about the Inn or B&B in a simple and accessible format. That allows call center agents to immediately take the calls for the Inn or B&B without any kind training or knowledge inherently related to a particular lodging facility, and indeed without even having heard of the Inn or B&B prior to receiving the first call from a potential guest. That is because the data entry system is universal, and specific pertinent information about the Inn or B&B will reside in the same place for all of the Inns or B&Bs using the service. Call center agents can quickly access the information needed to sell the Inn or B&B to guests, and the cost to the call center to gather that detailed information is zero.

2. How to provide access to the Inn's or B&B's detailed information to the call center agents, and how to train them to answer the calls correctly. The method of the present invention allows calls to the Inn or B&B to be directed to a call center. When a call comes in from the Inn or B&B to the call center, the agents must know exactly: (1) about which facility the caller is calling; (2) where to quickly and seamlessly find the information about the lodging facility; and (3) how to sell the lodging facilities accommodations and any other services. The method of the present invention addresses those specific needs in via the following steps: (1) assigning a unique Direct Inward Dial ("DID") number to each Inn or B&B; (2) providing a system that allows that number to appear on the agent's screen with the lodging facilities' name thus allowing the agent to answer the call with the correct greeting, using the lodging facility's name; (3) allowing a data intake specialist to review and vet the information the lodging facility's management enters about the facility so it is appropriate and complete for the caller agents' use; (4) making that information available to the calling agents so they can use it to sell the lodging facility's accommodations, comforts and services; (5) making the information about the lodging facility searchable so the calling agent can find any information requested by or pertinent to the caller easily and quickly.

Following the business method of this invention, the calling agents will be trained to sell the facilities features and services, to upsell to nicer rooms, and to close the sale. The method of the present invention uses the proven and proprietary Kennedy Training Network® sales method to provide the right structure to take control of the call, to convey the right information about the lodging facility, and to close the sale.

The Kennedy Training Network generally instructs the call center agents in sales techniques by teaching them how to:
1. Use proper opening dialog;
2. Listen interactively, paying special attention to callers opening remarks;
3. Obtain and use the caller's name conversationally and obtain a phone number;
4. Ask mandatory questions before searching availability such as needed dates, number of guests, room preference, special requirements, etc.
5. Determine guest's familiarity with lodging facility;
6. Ascertain reason(s) for travel;
7. Determine specific information guest wants to know about the lodging facility and surroundings;
8. Provide guests with any special policies of the lodging facility such as special fees, parking, etc.;
9. Offer upsell options such as upgrades;
10. Secure the reservation, including obtaining estimated time of arrival;
12. If guest is not ready or declines, remove barriers to booking and offer alternatives as far as price or specifics of accommodations;
13. Offer follow up call and additional assistance;
14. Offer any other available amenities; and
15. End call with thanking guest and using guest's name.

The method of the present invention comprises the following steps:
1. Onboarding call center lodging facilities, which, in turn, comprises the steps of:
   a. Creating an electronic portal using a commercially available, web-based software system called Caspio™, the web-based software system comprising a centralized cloud database;
   b. Populating the electronic portal thus creating a searchable and easily accessible database;
   c. Using the software system to maintain and customize the database to include data pertinent to each lodging facility;
   d. Creating a portal interface for lodging facilities thus making it intuitive for them; and
   e. Reviewing the data for accuracy and content.
2. Receiving and answering calls directed to lodging facilities, which, in turn, comprises the steps of:
   a. Allowing call center agents pre-trained in the Kennedy Network® system to access the same data available to Inn and B&B customers in a similar format;
   b. Maintaining all information about Inn and B&B customers in a web-based, centralized, password-protected, cloud database accessible via the Internet;
   c. Providing a commercially available call center telephone system, such as the commercially available system provided by Five9™, the phone system comprising routing ability to allow callers or potential guests to talk with the correct calling center agent at the correct time and to connect automatically with the software's database;
   d. Allowing the telephone system to route the information stored about each customer Inn or B&B on a computer screen operated by the calling center agent immediately upon a call being received; and
   e. Allowing the combination of functionality of the phone system and the centralized cloud database to provide the call center agents the information needed to customize the guest's calling experience and to turn a call into revenue for the customer Inn or B&B.
3. Providing booking and invoicing services for lodging facilities, which, in turn, comprises the steps of:
   a. Allowing each customer Inn or B&B to enter its payment information into the cloud database; and
   b. Allowing the customer's payment information to populate into a commercially available invoicing software called Invoicera™.

Figure 1:
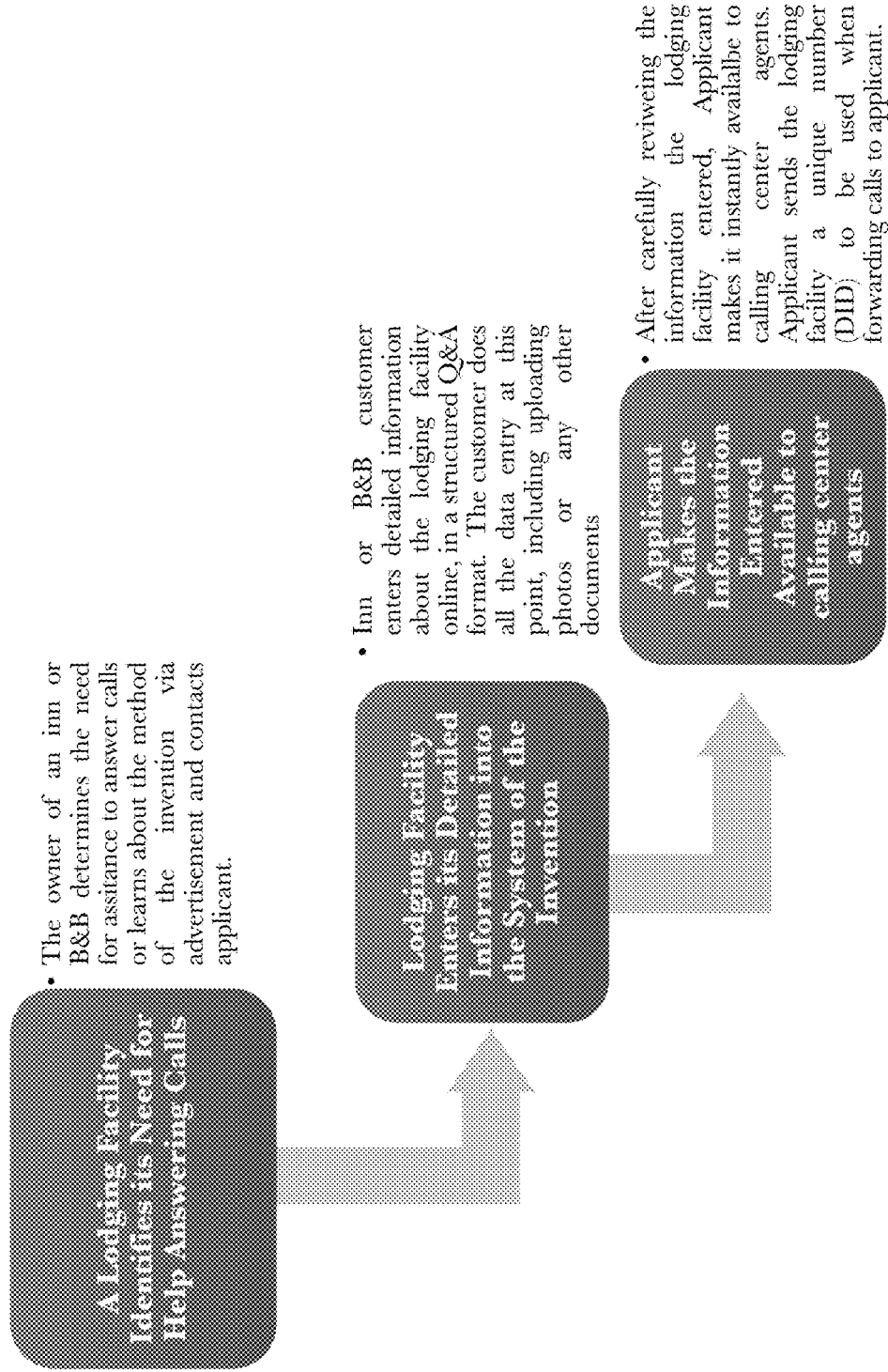
FIG. 1: is a schematic view of the practical advantages and logistics of the step of the method of the application comprising the onboarding of applicant's customers.
Figure 2:
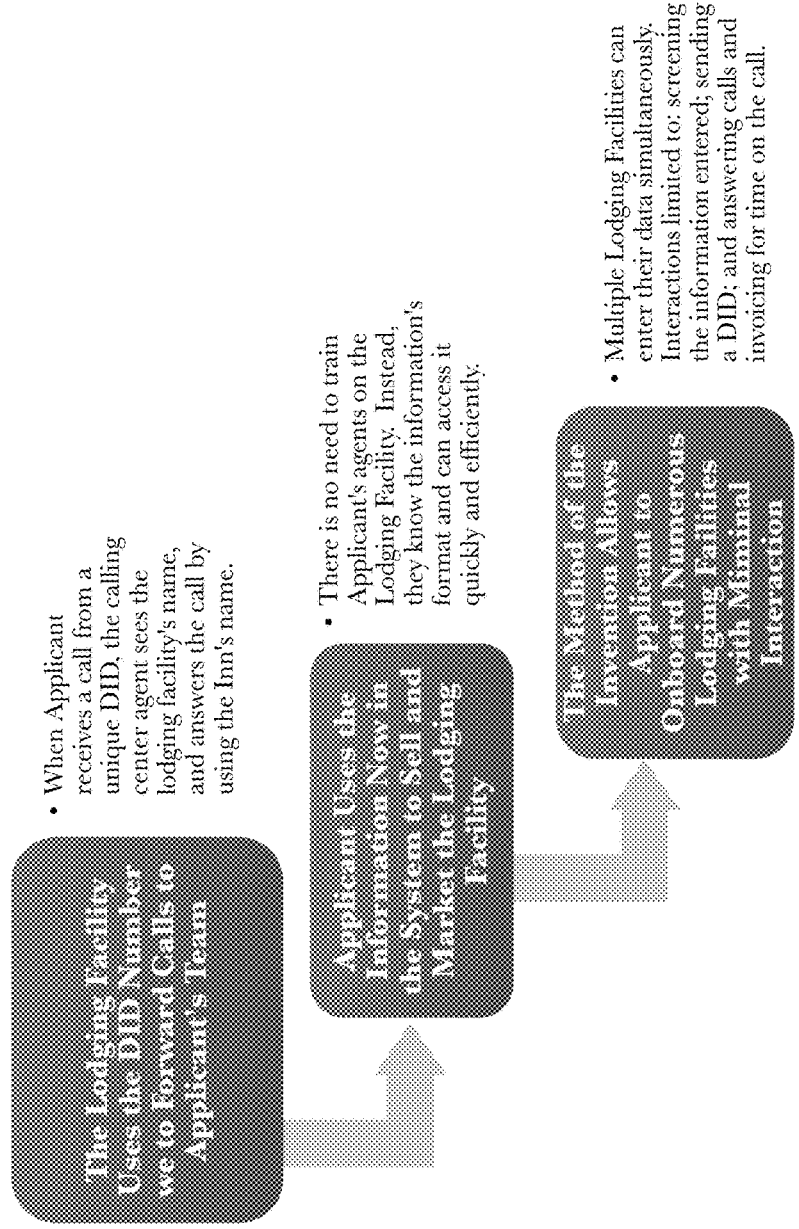
FIG. 2: is a schematic view of the practical advantages and logistics of the step of the method of the application comprising the call answering for applicant's customers.
Figure 3:
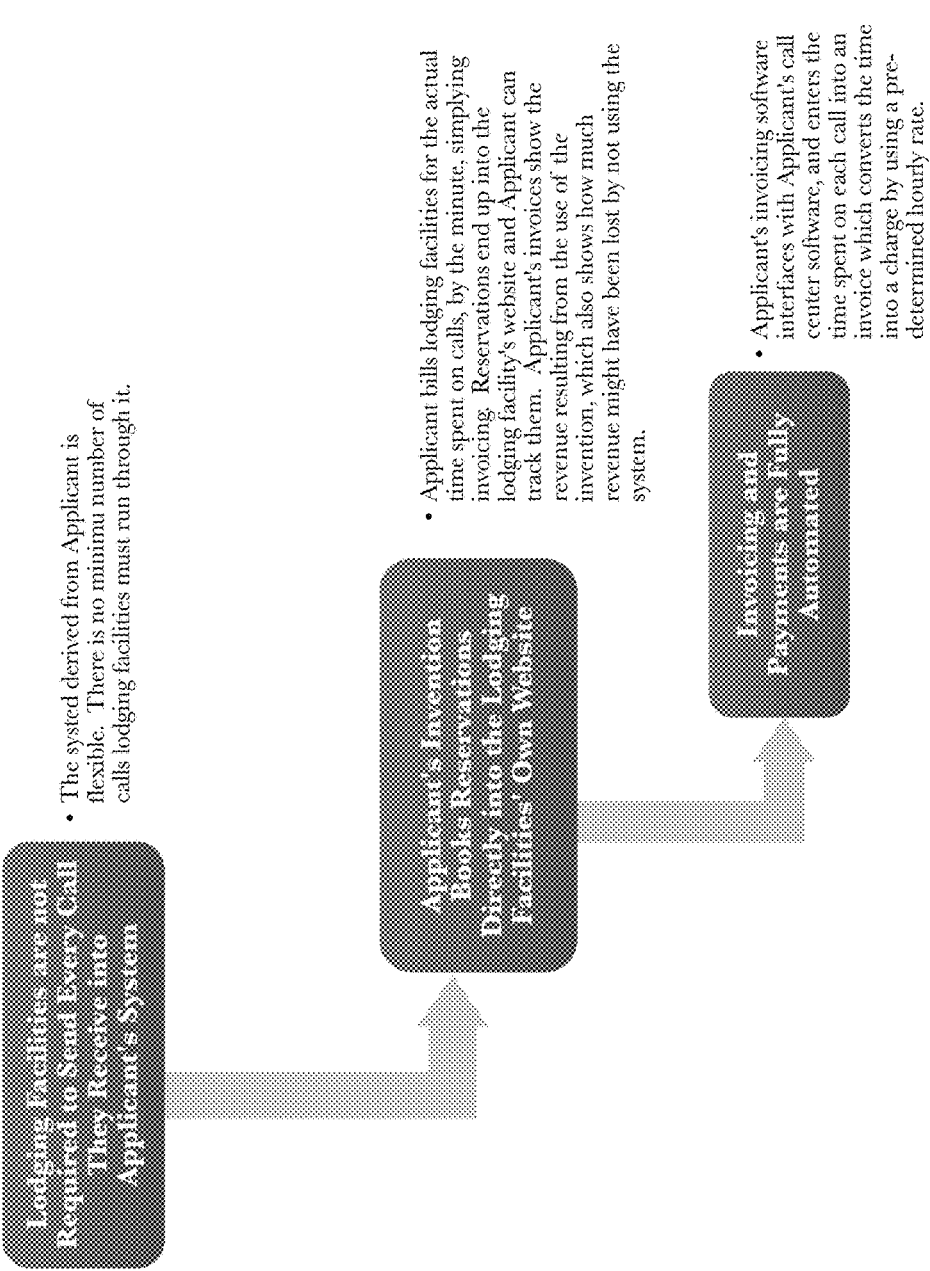
FIG. 3: is a schematic view of the practical advantages and logistics of the step of the method of the application comprising the operation (booking) and invoicing.

What is claimed is:

1. A method to provide a call center for small lodging facilities whereupon the lodging facility provides detailed information about the lodging facility's amenities in a simple and accessible format to a call center agent who in turn provides information to a caller and processes room bookings, the method comprising the steps of:
   a. Onboarding call center lodging facilities, the onboarding step further comprising the steps of:
      i. creating an electronic portal using a commercially available, web-based software system such as the commercially available system provided by Caspio™, the web-based software system comprising a centralized cloud database;
      ii. assigning a unique Direct Inward Dial ("DID") number to each lodging facility;

iii. Populating the electronic portal with data pertinent to each small lodging facility, thus creating a cloud-based, searchable and easily accessible database;
iv. making the data in the searchable database available to call center agents, so they can use it to provide information about the lodging facilities and market the lodging facility's accommodations, comforts and services to the lodging facility's callers;
v. allowing a data intake specialist to review and vet the information the lodging facility's management enters about the facility, so it is appropriate and complete for the call center agents' use;
vi. Using the software system to maintain and customize the searchable database to include data pertinent to each lodging facility; and
vii. Providing a feature that allows the DID number of the lodging facility to be associated with the telephone number a caller dials to reach a specific lodging facility so that the DID number appear on the call center agent's screen upon receiving a call comprising the lodging facilities' name thus allowing the agent to answer a telephone call with the correct greeting, using the lodging facility's name;
b. Receiving and answering calls directed to lodging facilities, which, in turn, comprises the steps of:
i. Allowing the call center agents pre-trained in the Kennedy Network® system to access the same data available to the lodging facilities while preserving the data's format;
ii. Maintaining all information about Inn and B&B customers in a web-based, centralized, password-protected, cloud database accessible via the Internet;
iii. Providing a commercially available call center telephone system, such as the commercially available system provided by Five9™, the phone system comprising routing ability to allow callers or potential guests to talk with the correct callcenter agent at the correct time and to connect automatically with the software's database;
iv. Allowing the call center telephone system to route the information stored about each lodging facility on a computer screen operated by the call center agent immediately upon a call being received; and
v. Allowing the combination of functionality of the phone system and the centralized, searchable cloud database to provide the call center agents the information needed to customize the guest's calling experience;
c. Providing booking and invoicing services for lodging facilities, which, in turn, comprises the steps of:
i. Allowing each lodging facility to enter its payment information into the searchable database; and
ii. Allowing the lodging facilities' payment information to populate into a commercially available invoicing software database such as the commercially available system provided by Invoicera™.

* * * * *